(12) United States Patent
Sanquist

(10) Patent No.: US 6,442,887 B2
(45) Date of Patent: Sep. 3, 2002

(54) LIVE BAIT KEEPER

(76) Inventor: Robert L. Sanquist, 1028 Hamlet Dr. South, Avon, Stearns, MN (US) 56310

( * ) Notice: Subject to any disclaimer, the term of this patent is extended or adjusted under 35 U.S.C. 154(b) by 0 days.

(21) Appl. No.: 09/793,667

(22) Filed: Feb. 26, 2001

Related U.S. Application Data

(60) Provisional application No. 60/185,049, filed on Feb. 25, 2000.

(51) Int. Cl.[7] ............................................. A01K 97/05
(52) U.S. Cl. .............................................. 43/55; 43/56
(58) Field of Search .......................... 43/55, 56, 44.99

(56) References Cited

U.S. PATENT DOCUMENTS

| | | | |
|---|---|---|---|
| 336,967 A | 3/1886 | Ward | |
| 807,875 A | 12/1905 | Shinners | |
| 2,250,942 A | 7/1941 | Allin | |
| 2,341,246 A | 2/1944 | Stowe | |
| 2,487,645 A | 11/1949 | Gershon | |
| 2,693,661 A | 11/1954 | Piker et al. | |
| 2,709,317 A * | 5/1955 | Pease, Sr. | 43/44.99 |
| 2,711,610 A | 6/1955 | Miller | |
| 2,717,469 A | 9/1955 | Piker et al. | |
| 2,719,382 A * | 10/1955 | Schachte | 43/44.99 |
| 2,729,912 A * | 1/1956 | Moffett | 43/44.99 |
| 2,883,788 A * | 4/1959 | Stitt | 43/55 |
| 3,023,533 A | 3/1962 | Bertram | |
| 3,039,224 A | 6/1962 | Hartzog | |
| 3,084,471 A * | 4/1963 | Alspaugh | 43/44.99 |
| 3,452,469 A * | 7/1969 | White | 43/55 |
| 3,717,124 A | 2/1973 | Jacobs | |
| 3,955,306 A | 5/1976 | Handa | |
| 4,030,226 A * | 6/1977 | Shelton et al. | 43/55 |
| 4,232,471 A * | 11/1980 | Kolk et al. | 43/44.99 |
| 4,450,647 A * | 5/1984 | Schmidt | 43/55 |
| 4,603,503 A * | 8/1986 | Haney | 43/56 |
| 4,638,593 A | 1/1987 | Garcia | |
| 4,685,242 A * | 8/1987 | Stanish | 43/44.99 |
| 4,914,856 A | 4/1990 | Kennedy | |
| 5,054,230 A * | 10/1991 | Woodman | 43/44.99 |
| 5,081,787 A * | 1/1992 | Adams | 43/55 |
| 5,481,823 A * | 1/1996 | Hoover et al. | 43/55 |
| 5,507,114 A * | 4/1996 | Stricker | 43/55 |
| 5,555,670 A * | 9/1996 | Troutman, Jr. | 43/44.99 |
| 5,586,406 A * | 12/1996 | Lin et al. | 43/55 |
| 5,720,124 A * | 2/1998 | Wentzell et al. | 43/44.99 |
| 5,729,928 A * | 3/1998 | Anderson | 43/44.99 |
| 6,301,824 B1 * | 10/2001 | Ashlock | 43/44.99 |

FOREIGN PATENT DOCUMENTS

| | | | | |
|---|---|---|---|---|
| DE | 38002 B1 * | 1/1887 | | 43/55 |
| EP | 760204 B1 * | 3/1997 | | |
| FR | 1106118 B1 * | 12/1955 | | 43/55 |
| FR | 2650155 B1 * | 2/1991 | | |
| GB | 2226743 B1 * | 7/1990 | | 43/44.99 |

* cited by examiner

*Primary Examiner*—Darren W. Ark
(74) *Attorney, Agent, or Firm*—Albert W. Watkins

(57) ABSTRACT

A PVC pipe is closed at one end with a cap. Small holes are provided in the pipe for fresh water exchange from the interior of the pipe to the exterior. A screw-off top cap enables bait to be inserted or removed from within the pipe. A stainless chain with snap hook is attached to the top of the pipe, and serves as a tether to limit the distance between the live bait keeper and a firm anchor, such as an eye-bolt or the like installed on a fish house or water craft. The container is non-corrosive, will not break when left in an ice hole that is later chipped open, and will preserve the bait in an ice hole during the winter or in open water during summer heat.

5 Claims, 2 Drawing Sheets

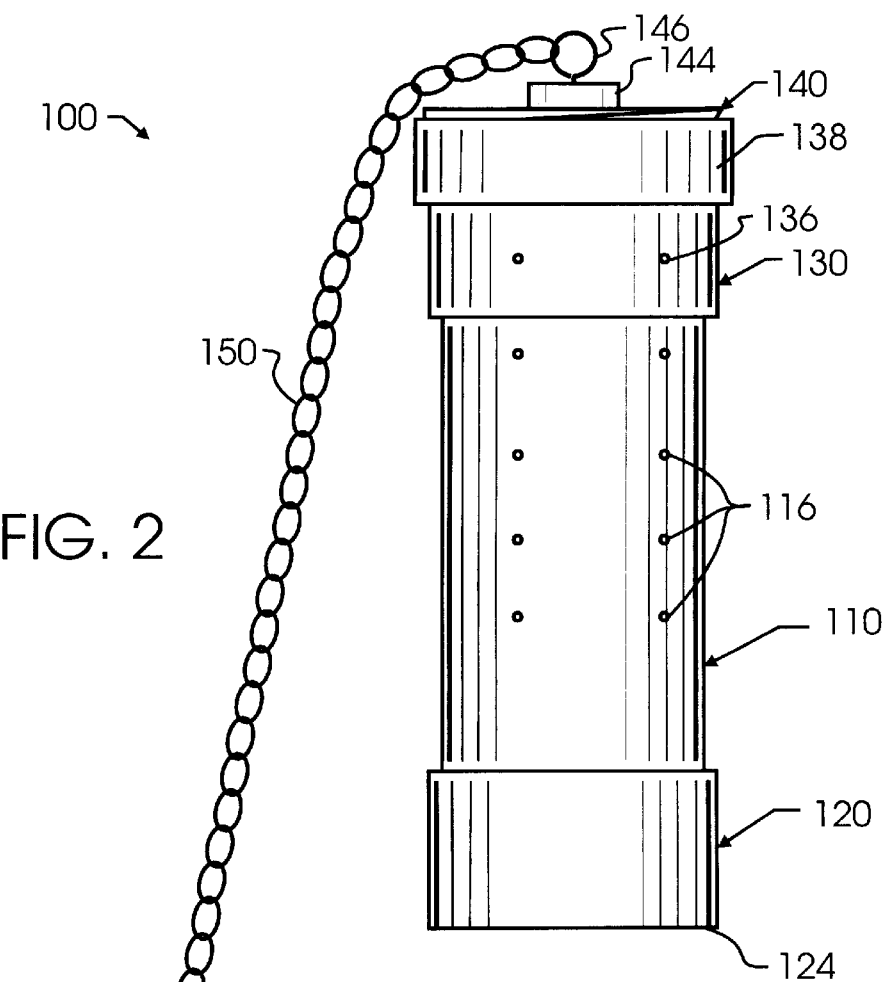
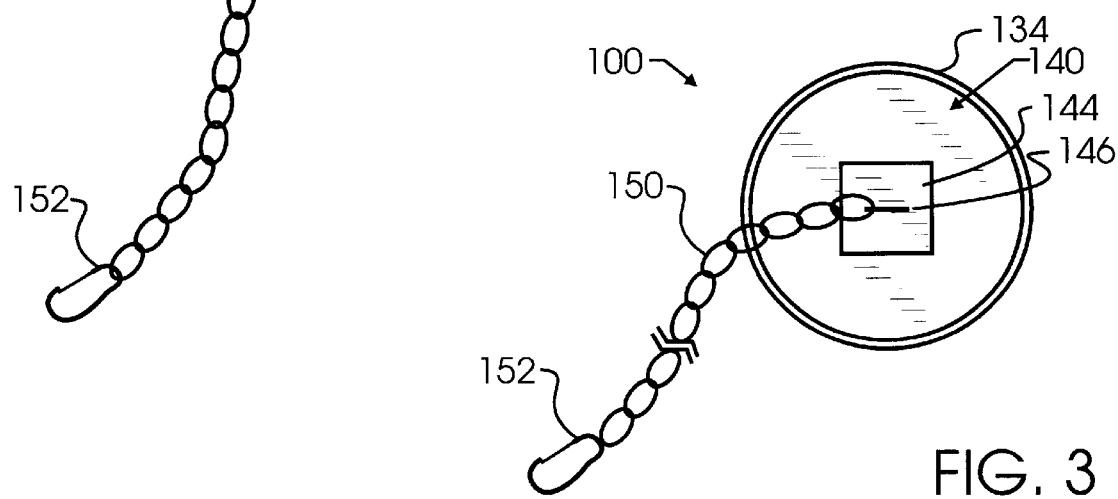

LIVE BAIT KEEPER

CROSS REFERENCE TO RELATED APPLICATIONS

This application claims priority to U.S. Provisional application Ser. No. 60/185,049 filed Feb. 25, 2000 and co-pending herewith.

BACKGROUND OF THE INVENTION

1. Field of the Invention

This invention pertains generally to fishing, and more particularly to a container that keeps live bait fresh. Most particularly, the present invention enables live bait to be stored in open-water and also in ice waters.

2. Description of the Related Art

When a fisherman embarks upon a fishing trip, whether for an afternoon or a multiple day trip, one part of the preparation is the securing of supplies, typically including the purchase of bait or lures. One particularly preferred type of bait is the live minnow. When used as bait, the minnow is allowed to swim at the end of a fish line where the minnow will lure larger fish. The larger fish will be then either be hooked upon fishing line, speared or otherwise caught. For this process of luring fish using minnows to be most effective, the minnow should be relatively fresh, so that it will swim naturally. A minnow which has not been properly kept will be lifeless at the end of the fishing line, and larger fish will tend to avoid such a minnow.

A number of containers have been devised with the common goal of maintaining live bait in a fresh condition. U.S. Pat. No. 336,967 to Ward; U.S. Pat. No. 807,875 to Shinners; U.S. Pat. No. 2,250,942 to Allin; U.S. Pat. No. 2,341,246 to Stowe; U.S. Pat. No. 2,487,645 to Gershon; U.S. Pat. No. 2,693,661 to Piker et al; U.S. Pat. No. 2,711,610 to Miller; U.S. Pat No. 2,717,469 to Piker et al; U.S. Pat. No. 3,023,533 to Bertram; U.S. Pat. No. 3,039,224 to Hartzog; U.S. Pat. No. 3,955,306 to Handa; U.S. Pat. No. 4,638,593 to Garcia U.S. Pat. No. 4,914,856 to Kennedy; and U.S. Pat. No. 5,081,787 to Adams each illustrate live bait containers. These containers typically provide small holes that allow an exchange of water from inside the container to an exterior thereof, and a lid or top through which live bait may be inserted or removed. However, the vast majority of these containers may only be used seasonally, since these containers are designed for use on open water during mild temperatures. In the event a seasonal bait container is used during the winter, when the water is iced over or the air temperature is below freezing, the bait will be frozen and die within the bait container. Furthermore, many of these containers also require relatively complex construction, and may include multiple walls or the like. Such complexity is undesirable. Finally, and surprisingly, many of the containers are not resistant to water and, depending upon the construction materials, may actually be harmful to the environment or the bait.

SUMMARY OF THE INVENTION

Exemplary embodiments of the present invention solve the inadequacies of prior bait containers by providing a PVC pipe closed at one end, having small holes in the pipe for fresh water inlet, a screw-off top cap, and a stainless chain with snap hook attached to the top of the pipe. The container is non-corrosive, will not break when left in an ice hole that is later chipped open, and will preserve the bait in an ice hole.

In a first manifestation, the invention is a tubular live bait keeper. A resilient and water impervious container retains live bait and includes an opening for insertion or removal of live bait, and also has water-permeable passages. A removable cover is provided for closing the container opening adjacent a first end of the container. The first end of the container is larger in cross-section than a remainder of the container. A detachable tether is also provided.

In a second manifestation, the invention is a tubular bait keeper for keeping live bait fresh. A tubular conduit has a length from a first end to a second end and a maximum cross-sectional dimension along the length. The conduit additionally has a first opening at the first end of the conduit and a second opening distal to the first opening. The first and second openings are larger than the live bait. A plurality of openings in the conduit intermediate to the first and second openings are smaller than the live bait. A cap has a wall enclosing the first conduit opening and has a maximum cross-sectional dimension equal to the sum of the tubular conduit maximum cross-sectional dimension, twice a thickness of the cap wall and a small tolerance factor. A tubular coupler attached adjacent the second opening has a removable fastener distal to the second opening. The tubular coupler has a maximum cross-sectional dimension equal to the sum of the cap maximum cross-sectional dimension, twice a thickness of the removable fastener, and a small tolerance factor. A removable cap of maximum cross-sectional dimension less than the tubular coupler maximum cross-sectional dimension encloses the tubular coupler adjacent the second opening and thereby prevents passage of live bait into or out of the tubular conduit through the tubular coupler. A tether is attached for retaining the keeper a maximum distance from a fixture. Separation of ice adjacent the tubular coupler and removal of the tubular coupler therefrom creates an opening in the ice of sufficient dimension to allow passage of the tubular conduit and cap through the ice opening.

OBJECTS OF THE INVENTION

A first object of the invention is to preserve live bait for most effective luring of fish. A second object of the invention is to enable live bait to be kept for extended periods within an ice fishing hole. A third object of the invention is to provide a bait keeper that is environmentally friendly and non-corrosive. A further object of the invention is store bait sufficiently below surface water to provide moderation of temperature and avoid the harmful effects of direct sunlight. Another object of the invention is to store bait for extended periods without the need to change or replace water that the bait is stored in. Yet another object of the invention is to provide a live bait keeper that may be manufactured from readily available and low-cost materials.

BRIEF DESCRIPTION OF THE DRAWINGS

Other objects, advantages, and novel features of the present invention can be understood and appreciated by reference to the following detailed description of the invention, taken in conjunction with the accompanying drawings, in which:

FIG. 2 illustrates the preferred embodiment live bait keeper of FIG. 1 shown from a side plan view.

FIG. 3 illustrates the preferred embodiment live bait keeper of FIG. 2 from a top plan view.

DESCRIPTION OF THE PREFERRED EMBODIMENT

Figure 1:
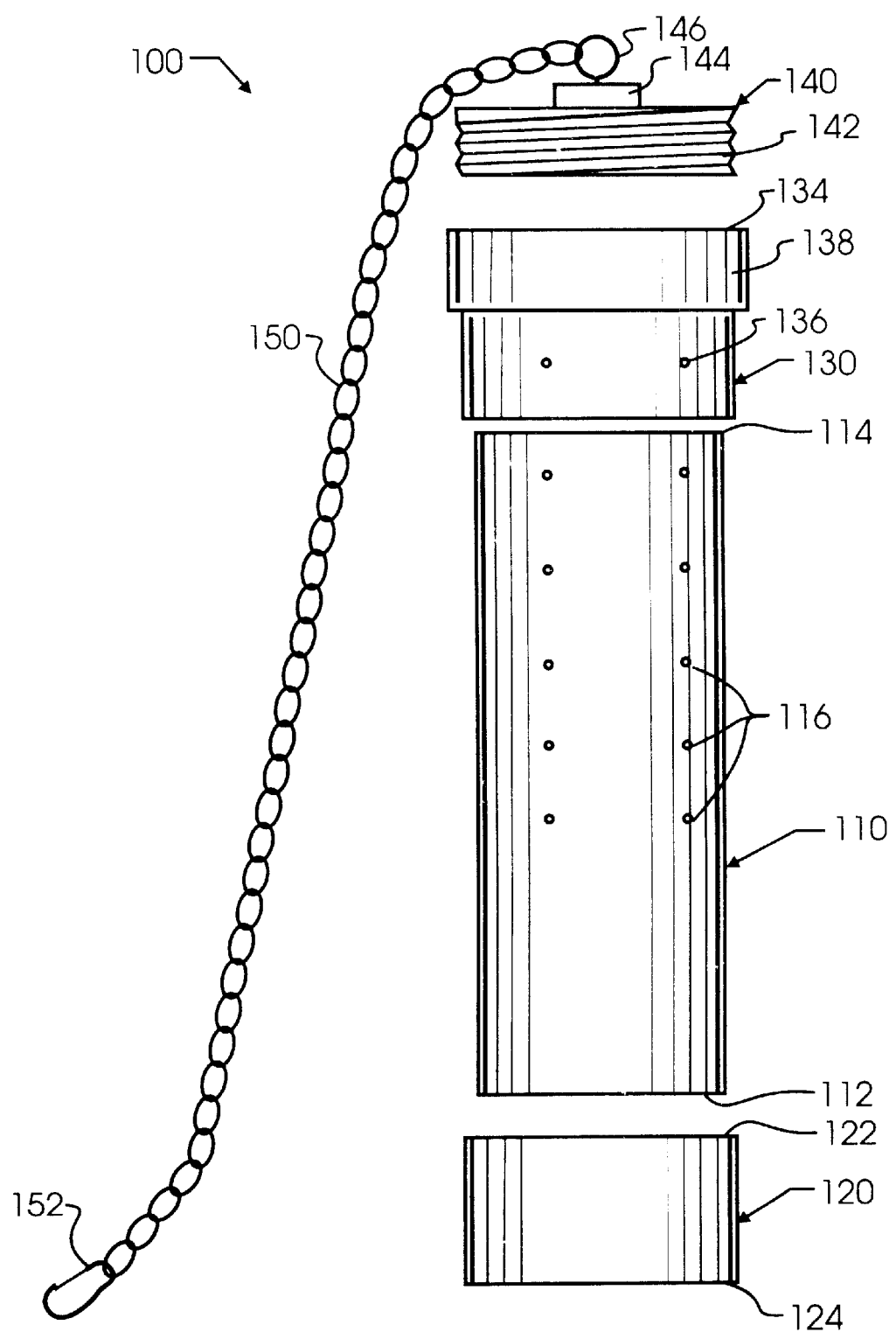
FIG. 1 illustrates the preferred embodiment live bait keeper designed in accord with the teachings of the present invention from a side exploded assembly view.

Live bait keeper 100 is constructed from generally cylindrical, commonly available Poly-Vinyl Chloride (PVC) pipes, fittings and connections. While other polymers may be satisfactory in the working of the invention, PVC has a number of important characteristics that are preferred in the present invention. Among these desirable characteristics are imperviousness to water, including corrosion resistance even in the presence of impurities, and lack of water absorption. Other materials that might otherwise be satisfactory owing to durability and corrosion resistance, such as nylon, have significant water absorption that is undesirable. In addition, PVC plastic is resilient and durable through a very wide temperature range, enabling the present invention to be used within an ice-fishing hole, surviving the compressive forces that will be placed thereon at freezing temperatures. PVC is also slightly more dense than water, and so a container made using PVC will naturally sink within water. Another desirable characteristic is wide availability and low-cost, both which are enabled by the current mass-production of a variety of PVC pipes and fittings. The present invention is contemplated to be manufactured from different diameters of PVC pipes and different lengths, depending upon the intended application. With the use of PVC, there are many commercially available stock sizes to select from. Finally, machinability and ease of assembly are both excellent with PVC pipe, making the present invention readily manufacturable at high production yield and low production cost.

Container 110 serves as the primary bait receptacle, forming a wall between an interior space where live bait and water may be kept and an exterior which may comprise air, water, or even ice. In the preferred embodiment, container 110 is most preferably manufactured from PVC pipe or thin or thick-walled PVC conduit. Surrounding the bottom end 112 of container 110 is a PVC end cap 120, which is generally cylindrical and open on end 122 to circumscribe end 112, and which is otherwise closed including a solid surface at end 124 which effectively closes container 110 adjacent end 112. The maximum cross-sectional dimension of end cap 120 is equal to the maximum cross-sectional dimension of container 110, plus two wall thicknesses, plus a small tolerance that ensures end cap 120 will slide circumferentially about container 110. End cap 120 will most preferably be glued to container 110 using commercially available adhesive for PVC pipe and conduit. Holes 116 are most preferably provided in container 110 to allow the passage of water between interior and exterior. However, holes 116 are also most preferably smaller in dimension than the smallest bait to be retained within container 110. As can be seen in the figures, holes 116 in the most preferred embodiment do not extend entirely from bottom end 112 to top end 114 of container 110. Instead a small fully-enclosed space is left adjacent bottom end 112.

At top end 114 of container 110 distal to end 112 is a PVC coupler 130, such as the type commonly used to provide access through a threaded cap. Coupler 130 is configured to allow end 132 to slide concentrically about container 110 adjacent end 114, and may be glued thereto using the aforementioned PVC pipe and conduit adhesive. Coupler 130 also includes a slightly larger diameter threaded section 138 adjacent end 134, and may optionally include several additional water passage holes 136 similar in function and dimension to holes 116. Into threaded section 138 may be inserted end cap 140, having complimentary threading 142 which allows for rotary engagement and disengagement between end cap 140 and coupler 130. A nut or other similar tool attachment 144 is most preferably formed integrally into end cap 140, which ensures the ability of a user to remove end cap 140 from coupler 130, even in the event of ice accumulation or the like which might otherwise prevent end cap 140 from being separated from coupler 130. In the most preferred embodiment, a ring 146 is additionally provided on end cap 140. The maximum cross-sectional dimension of coupler 130 is equal to the maximum cross-sectional dimension of container 110, plus two fastener thicknesses, plus a small tolerance that ensures coupler 130 will slide circumferentially about container 110 before being permanently fastened thereto.

A tether 150 is provided, having a spring clip 152 attached at one end, and being permanently attached or alternatively spring-clipped to ring 146 at the opposite end. Tether 150 may be manufactured from a wide variety of materials, having only a few basic preferred characteristics. One preferred characteristic is water resistance, so ordinary steels or even plated materials are much less preferred. Polymers are suitable, though stainless steel is most preferred, owing to the intrinsic corrosion resistance and strength of stainless steel.

In use, end cap 140 will be removed from coupler 130, and bait will be added within live bait keeper 100. Most preferably, a small amount of water will also be provided, but not enough to rise to the level of holes 116 closest to bottom end 112. End cap 140 is then replaced, ensuring live bait will be retained within container 1 10. Filled this way, live bait keeper 100 serves as a minnow bucket or reservoir to transport bait within water. Once the fisherman arrives at a lake, river or other body of water for fishing, clip 152 will be attached to some type of anchor, such as an eye-bolt anchored to a boat, dock or fish house. Next, container 110 will be lowered into the water, and will fill with water through holes 116, 136. This will allow live bait to move throughout container 110 and receive ample fresh, oxygenated water. When the fisherman needs fresh live bait, he must raise container 110 from the water, this time allowing water to drain out from holes 116, 136. End cap 140 is then removed, and a fresh minnow or the like is then removed from container 110. End cap 140 is replaced, and container 110 again lowered into the water.

In the event the water is frozen over, such as when ice fishing, a hole will normally be drilled or augered through the ice to the water. Most preferably, the largest diameter or cross-section of live bait keeper 100 is found at the top, adjacent end cap 140. Live bait keeper 100 may then be lowered into the water, and ice allowed to reform adjacent to coupler 130. Since live bait can swim distal to coupler 130, the bait can swim in water even with the formation of ice adjacent coupler 130. This allows live bait keeper 100 to be left within a frozen hole for extended periods, without harming live bait. Consequently, once live bait keeper 100 is placed within a hole in the ice, keeper 100 may be left there for days without requiring care or attendance. The fisherman is thus relieved of having to tend to the bait during subsequent trips to and from the ice house. Furthermore, the risk of freezing live bait during those subsequent trips is eliminated. The use of PVC is particularly advantageous in this application, since the very low thermal conductivity of PVC plastic retards the formation of ice lower than the level of ice within the body of water.

Once the hole is frozen, the fisherman will in most cases be able to simply raise container 110 from the hole by pulling on chain 150. For this reason, chain 150 will most preferably be relatively strong. In the event the ice has formed over the top of end cap 140, or otherwise trapped live bait keeper 100 within the ice, the fisherman may simply chip the ice away from keeper 100. PVC is resilient at low temperatures, ensuring that the chipping will only break the ice, and not destroy keeper 100.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while the preferred embodiment is illustrated as being cylindrical, it will be apparent that hollow polyhedrons and other similar tubular geometries may also be used. Consequently, the scope of the invention is set forth and particularly described in the claims hereinbelow.

I claim:

1. A tubular live bait keeper, consisting of:
   a tubular conduit having a length from a first end to a second end, a first opening at said first end of said conduit and a second opening at said second end of said conduit, and a plurality of openings located along the length of said tubular conduit which extend through said tubular conduit, are smaller than said first and second openings, and are intermediate said first and second openings;
   a tubular coupler attached to said tubular conduit and circumscribing said first end of said tubular conduit, said tubular coupler having an inner threaded section distal to said first opening;
   a removeable cap with threads engaging said inner threaded section of said tubular coupler, said removeable cap having a ring extending from a top of said removeable cap;
   a detachable tether comprising a chain which is attached to said ring extending from said top of said removeable cap; and
   a cap having both an open end circumscribing said second end of said tubular conduit and a solid wall enclosing said second opening and extending across said second opening.

2. The tubular live bait keeper of claim 1 wherein said plurality of openings are located along the length of said tubular conduit from said first end towards said second end, thereby forming a live bait bucket at said second end for retaining live bait in water retained within said container when said container is removed from submersion in water.

3. The tubular live bait keeper of claim 1 wherein said tubular coupler has the largest outside diameter on the tubular live bait keeper.

4. The tubular live bait keeper of claim 1 wherein said tubular conduit comprises PVC pipe.

5. The tubular live bait keeper of claim 1 wherein said chain is made of stainless steel.

* * * * *